(12) United States Patent
Peled et al.

(10) Patent No.: US 9,269,997 B2
(45) Date of Patent: Feb. 23, 2016

(54) RECHARGEABLE ALKALI METAL-AIR BATTERY

(75) Inventors: Emanuel Peled, Even Yehuda (IL);
Diana Golodnitsky, Rishon Lezion (IL);
Hadar Mazor-Shafir, Herzliya (IL);
Meital Goor Dar, Tel Aviv (IL); Shlomo Avshalomov, Ashdod (IL)

(73) Assignee: RAMOT AT TEL AVIV UNIVERSITY LTD., Tel Aviv (IL)

( * ) Notice: Subject to any disclaimer, the term of this patent is extended or adjusted under 35 U.S.C. 154(b) by 596 days.

(21) Appl. No.: 13/702,309

(22) PCT Filed: May 31, 2011

(86) PCT No.: PCT/IB2011/052377
§ 371 (c)(1),
(2), (4) Date: Dec. 23, 2012

(87) PCT Pub. No.: WO2011/154869
PCT Pub. Date: Dec. 15, 2011

(65) Prior Publication Data
US 2013/0157149 A1 Jun. 20, 2013

Related U.S. Application Data

(60) Provisional application No. 61/352,414, filed on Jun. 8, 2010.

(51) Int. Cl.
*H01M 12/08* (2006.01)
*H01M 4/38* (2006.01)
*H01M 8/06* (2006.01)
*H01M 12/06* (2006.01)
*H01M 10/39* (2006.01)

(52) U.S. Cl.
CPC ............. *H01M 12/08* (2013.01); *H01M 4/38* (2013.01); *H01M 8/065* (2013.01); *H01M 12/06* (2013.01); *H01M 10/39* (2013.01); *H01M 10/3909* (2013.01); *H01M 10/399* (2013.01); *H01M 10/3918* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 2,921,110 A | 1/1960 | Crowley et al. | |
| 3,607,417 A | 9/1971 | McRae et al. | |
| 4,219,611 A * | 8/1980 | Breault | 429/498 |
| 4,816,352 A | 3/1989 | Gordon | |
| 5,387,330 A * | 2/1995 | Taniguchi et al. | 204/421 |

(Continued)

FOREIGN PATENT DOCUMENTS

| | | |
|---|---|---|
| GB | 1215225 A | 12/1970 |
| WO | 03/001617 A2 | 1/2003 |

OTHER PUBLICATIONS

International Application PCT/IB2011/052377 Search Report dated Feb. 15, 2012.
Peled et al., "An Advanced Tool for the Selection of Electrolyte Components for Rechargeable Lithium Batteries", Journal of the Electrochemical Society, vol. 145, issue 10, pp. 3482-3486, Oct. 1998.

*Primary Examiner* — Jeremiah Smith
(74) *Attorney, Agent, or Firm* — D. Kligler IP Services Ltd.

(57) ABSTRACT

An energy storage cell (20) including: an anode (40) formed of a molten alkali metal; an air cathode (60); and an electrolyte medium (50) located between the anode and cathode.

40 Claims, 9 Drawing Sheets

(56) References Cited

U.S. PATENT DOCUMENTS

2003/0087156 A1* 5/2003 Broman et al. ............... 429/235
2004/0202924 A1* 10/2004 Tao et al. ..................... 429/102
2008/0268327 A1 10/2008 Gordon et al.

* cited by examiner

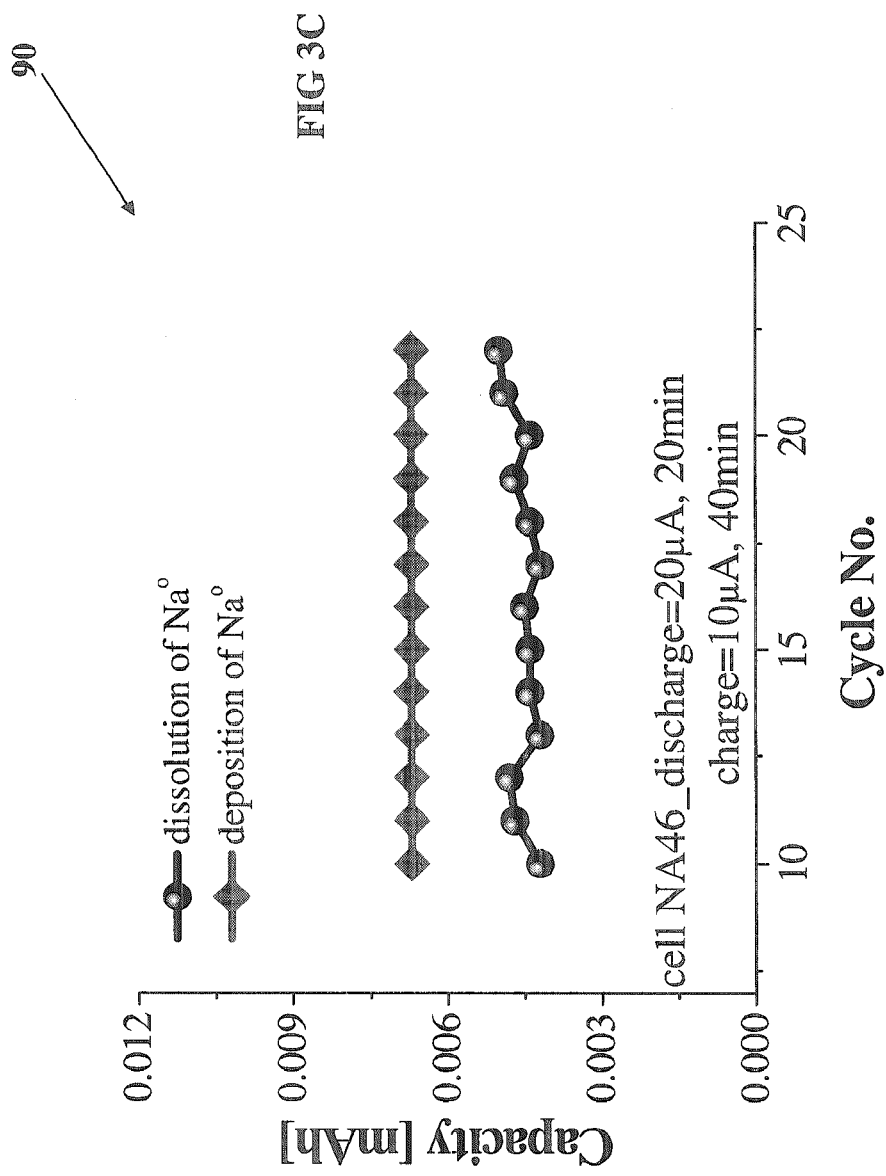

RECHARGEABLE ALKALI METAL-AIR BATTERY

CROSS-REFERENCE TO RELATED APPLICATION

This application claims the benefit of U.S. Provisional Patent Application 61/352,414, filed 8 Jun. 2010, which is incorporated herein by reference.

TECHNICAL FIELD

Embodiments of the invention relate to batteries that store electrical energy and provide electrical energy.

BACKGROUND

Batteries are common household and industrial power sources familiar to almost everyone and used in a myriad of different low tech to high tech devices and applications. Batteries are used in flashlights, radios, laptop computers, personal medical devices such as hearing aids and insulin pumps, energy storage units for electrical grids and solar energy sources, and vehicles. Batteries may be single use, throwaway batteries, which are used once and discarded, or rechargeable batteries that may repeatedly be charged to store electrical energy and discharged to provide useful electrical current.

A battery comprises at least one, and typically many, energy storage units, referred to as "cells" that are configured to store electrical energy and are controllable to release the energy to provide power. While there are many different types and configurations of cells, many of the most common cells typically comprise an anode and a cathode that sandwich an electrolyte medium between them. During discharge reactions take place in the cell. The cell converts the free energy of cell's reactions into electric energy. During discharge, at the anode a component of the anode is oxidized and at the cathode a component of the cathode is reduced.

If the anode and cathode are not electrically connected so that a current of electrons can flow from the anode to the cathode, a state of equilibrium is reached at which there is no net reaction. A potential difference between the anode and cathode at equilibrium is referred to as an "open circuit voltage (OCV)".

If on the other hand, the anode and cathode are connected by a conducting element, electrons flow from the anode to the cathode through the conducting element and ions flow through the electrolyte medium. The currents continue to flow until one of the active materials, a component of the anode that is oxidized or a component of the cathode that is reduced, is consumed, or when one of the anode or cathode is blocked by, for example, a discharge product.

If the battery is a single use, one time, throwaway battery, the discharge product cannot be converted (by charging the cell) back to its original components. If the battery is rechargeable, the discharge product or products can be converted back to their respective origins in the anode and cathode. Recharging is performed by driving a current through the battery in a direction opposite to the flow of current during discharging.

State-of-the-art lithium-ion polymer cells are considered to be the best rechargeable cells on the market. They comprise a graphitic-carbon anode and a lithium-intercalated transition-metal-oxide positive electrode. A liquid electrolyte comprising lithium salts dissolved in organic solvents and supported in a microporous-polymer separator is located between the anode and cathode. The theoretical specific energy of lithium-ion polymer battery cells is about 400 to 500 watt-hours/kg (Wh/kg).

Lithium-air cells and other alkali metal-air cells comprising an aqueous electrolyte require a relatively complicated arrangement to isolate the alkali metal from the aqueous electrolyte. US Publication US 2008/0268327, the disclosure of which is incorporated herein by reference, describes alkali metal-air cells comprising an alkali metal anode, an air cathode, an aqueous electrolyte in ionic communication with the cathode and an alkali metal cation conductive membrane that isolates the anode from the aqueous electrolyte.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY

An embodiment of the invention relates to providing an alkali metal-air, or alkali metal alloy-air, cell that may repeatedly be charged and discharged, so as to store energy during the charge, and produce energy during the discharge. The cell comprises a molten alkali metal, or molten alkali metal alloy anode, an air or oxygen cathode, and an alkali metal ion conducting electrolyte medium sandwiched between the anode and cathode. The molten alkali metal or its alloy is supported by a porous substrate, which is formed from any suitable material compatible with the metal or alloy and the electrolyte medium, and the cell is operated at a temperature for which the metal or alloy is liquid. During discharge of the cell, alkali metal cations from the anode combine with oxygen provided by the cathode to form a cell discharge product comprising reduced oxygen species. During charging, the alkali metal is recovered from the discharge product and deposited on the anode and oxygen is released at the cathode.

By operating the cell at a temperature for which the alkali metal or its alloy is liquid, during charging of the cell, when the alkali metal is converted back from the cell discharge product or products, surface tension of the liquid tends to homogenize redeposition of the alkali metal or alloy in liquid form onto the anode substrate. Clumps or drops of the metal or alloy, which might form on the anode during charging, tend to coalesce into larger drops and fuse into the body of liquid metal or alloy supported by the anode, rather than remain as isolated protuberances on the anode. As a result, growth of solid alkali metal dendrites that damage the cell and limit a number of times that the cell can be satisfactorily recharged tends to be suppressed.

Exemplary liquid anode materials for practicing embodiments of the invention are the alkali metals Lithium (Li), Sodium (Na), Potassium (K), Rubidium (Rb) and Cesium (Cs), or an alloy or a eutectic comprising at least two of the alkali metals or an alkali metal with a non-alkali metal. Exemplary non-alkali metals for alloying with an alkali metal to provide a liquid anode for a cell in accordance with an embodiment of the invention are Gold (Au), Mercury (Hg), Indium (In), Lead (Pb), Antimony (Sb), Tin (Sn), Bismuth (Bi) and Tellurium (Tl). Maximum concentrations of a secondary metal alloyed with a primary alkali metal to provide an alloy for an anode of a cell in accordance with an embodiment of the invention are, by secondary metal in % wt following discharge of the cell: Au 5%; Ba 5%; Cd 3%; Hg 15%; In 2%; Li 2%; Pb 1%; Sb 1%; Sn 1%, Tl 15%. Relatively low melting point alkali metals suitable for providing an alkali metal-air cell that operates at a relativley low temperature in accordance with an embodiment of the invention are, Na, K, Rb, and Cs, which have melting points at 97° C., 63.4° C., 39.4° C., and 28.4° C. respectively.

In an embodiment of the invention, a low temperature alkali metal-air cell comprises a liquid sodium (Na) anode in which the liquid sodium in the anode is supported by a porous substrate formed, by way of example, from Carbon (C), Nickel (Ni), Aluminum (Al), and/or Titanium. The cell is operated at a temperature above the melting point, 97.8° C., of Na to maintain the Na in a molten state during operation.

In an embodiment of the invention, the anode is substantially completely covered by a Solid Electrolyte Interphase (SEI), film, which is an electronic insulator and conductor of sodium ions and functions to protect the anode from corrosion. To provide the SEI film, in accordance with an embodiment of the invention, precursor compounds whose reaction products with Na are good Na cation conductors, are electronic insulators, and have equivalent volumes greater than that of Na, are added to the electrolyte to promote growth of the SEI. Suitable examples of precursor additives for forming the SEI in the sodium air cell, are additives whose reaction products comprise sodium oxo salts of sulfur, for example: $Na_2S_2O_4$, $Na_2S_2O_3$, $Na_2S$ and/or $Na_2SO_4$, such as ethylene sulfite $C_2H_4O_3S$ and methyl methane sulfonate $C_2H_6O_3S$. Protection of the anode against corrosion by a SEI in accordance with an embodiment of the invention is advantageous for enabling efficient recharging of the Na-Air cell for a relatively large number of recharging cycles.

There is also provided, according to an embodiment of the present invention, an energy storage cell, including:
  an anode including a molten alkali metal;
  an air cathode; and
  an electrolyte medium located between the anode and the cathode.

Typically, the molten alkali metal includes a metal from the group of metals consisting of Lithium (Li), Sodium (Na), Potassium (K), Rubidium (Rb) and Cesium (Cs).

The alkali metal may be included in an alloy of the metal, and the alloy may include at least two alkali metals. Alternatively or additionally, the alloy includes at least one metal from the group of metals consisting of: Gold (Au), Mercury (Hg), Indium (In), Lead (Pb), Antimony (Sb), Tin (Sn), Bismuth (Bi), and Tellurium (Tl).

In a disclosed embodiment the temperature of the molten alkali metal is less than about 50° C. above the melting point of the metal. In a further disclosed embodiment the temperature of the molten alkali metal is less than about 25° C. above the melting point of the metal. In a yet further disclosed embodiment the temperature of the molten alkali metal is less than about 10° C. above the melting point of the metal.

In an alternative embodiment the molten alkali may be supported by a porous substrate. The porous substrate may include at least one of: graphite, an intercalation compound of graphite, a high surface area carbon, carbon nanotubes, a sponge of aluminum, a sponge of titanium, and a sponge of an aluminum-titanium alloy. Alternatively or additionally, the porous substrate is formed from at least one of the sponge of aluminum, the sponge of titanium, and the sponge of aluminum-titanium alloy, and has a covering layer of at least one of carbon and graphite, wherein the covering layer has a thickness less than about 1 micron.

The electrolyte medium may be a non-aqueous medium. Typically, the non-aqueous medium includes at least one of a solid and a liquid. The solid may include at least one of sodium beta alumina, lithium beta alumina, and sodium nitrite.

The electrolyte medium may include at least one of an ionic liquid and a polymer electrolyte. In some embodiments, the electrolyte medium includes the alkali metal.

In a disclosed embodiment a solid electrolyte interphase film covers the anode, and the solid electrolyte interphase film has an equivalent volume at least equal to the equivalent volume of the alkali metal.

The cell may include a gas delivery system that delivers at least one of air and oxygen to the air cathode.

The air cathode may include an oxygen redox catalyst. Typically, the redox catalyst comprises at least one of $MnO_2$, Ag, $Co_3O_4$, $La_2O_3$, $LaNiO_3$, $NiCo_2O_4$ and $LaMnO_3$. In some embodiments the air cathode is formed having a three phase structure in which the catalyst is located, and in which oxygen, material from the electrolyte medium, and the catalyst interact.

In one embodiment the cell includes reduced oxygen species which are formed at the air cathode with alkali cations provided by the anode, on discharge of the cell.

Typically, the cell is rechargeable.

There is also provided, according to an embodiment of the present invention, a stack of energy storage cells, each cell including:
  an anode including a molten alkali metal;
  an air cathode; and
  an electrolyte medium located between the anode and the cathode,
  and an electrically conducting bipolar plate located between each pair of cells.

There is also provided, according to an embodiment of the present invention, a method for producing an energy storage cell including:
  forming an anode including a molten alkali metal;
  forming an air cathode; and
  locating an electrolyte medium between the anode and cathode.

There is also provided, according to an embodiment of the present invention, a method for generating energy, including:
  forming a cell having an anode comprising a molten alkali metal;
  forming an air cathode in the cell;
  locating an electrolyte medium between the anode and cathode; and
  discharging the cell.

This Summary is provided to introduce a selection of concepts in a simplified form that are further described below in the Detailed Description. It is not intended to identify key features or essential features of claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

FIG. 3C shows another graph of charge discharge capacity of the test cell, in accordance with an embodiment of the invention.

DETAILED DESCRIPTION

In the following detailed description, a sodium-air (Na-Air) cell, comprising a liquid sodium anode is described as an exemplary embodiment of the invention.

Figure 1A:
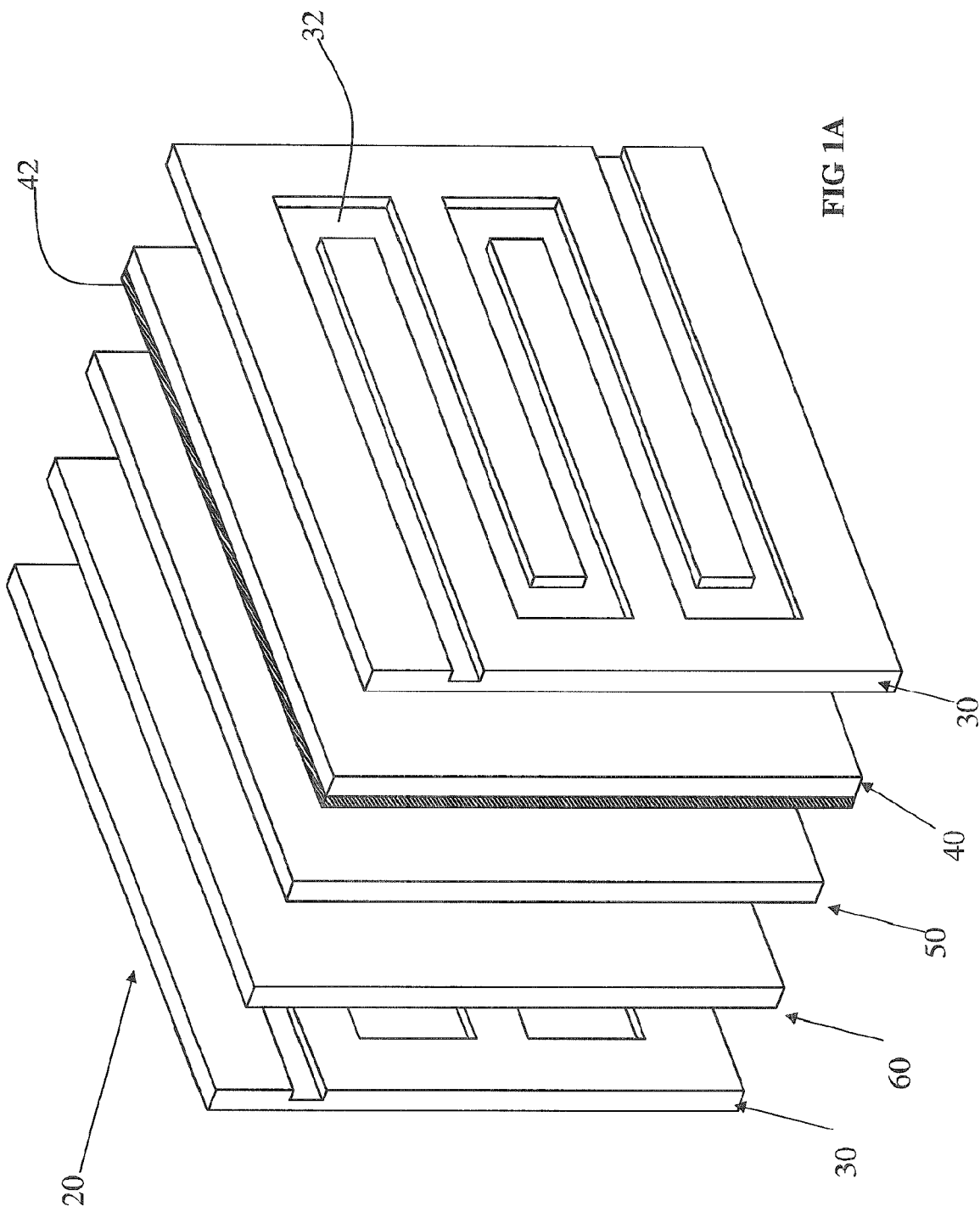
FIGS. 1A and 1B schematically show perspective views of an exploded and assembled Na-Air cell, in accordance with an embodiment of the invention.
Figure 1B:
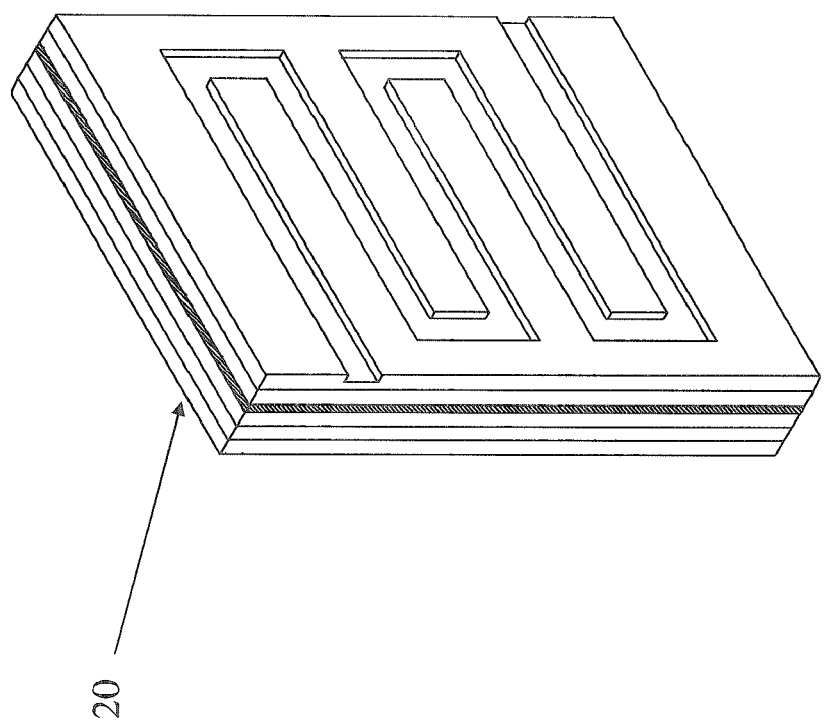

FIGS. 1A and 1B schematically show perspective views of an exploded and assembled Na-Air cell 20, in accordance with an embodiment of the invention. Cell 20 comprises contact plates 30 that sandwich between them a liquid sodium (Na) anode 40, an electrolyte medium 50 comprising ionic conducting electrolytes containing a salt of the anode alkali metal, and an air cathode 60, in accordance with an embodiment of the invention.

A contact plate 30 makes electrical contact with an adjacent anode 40 or cathode 60 to conduct current into or out of the anode or cathode and thereby into or out of cell 20. By way of example, contact plates 30 are formed having flow channels 32 for air or oxygen. Flow channels 32 in contact plate 30 in electrical contact with air cathode 60 are used to provide a flow of air or oxygen to the air cathode. When Na-Air cell 20 is stacked with another, similar air cell, contact plate 30 in electrical contact with Na anode 40 makes electrical contact with air cathode 60 of the other cell, and flow channels 32 in the contact plate are used to provide a flow of air to the air cathode of the other cell. Optionally, each contact plate 30 comprises flow channels (not shown) for flow of a cooling fluid, liquid or gas, for controlling temperature of cell 20 during operation.

Figure 1C:
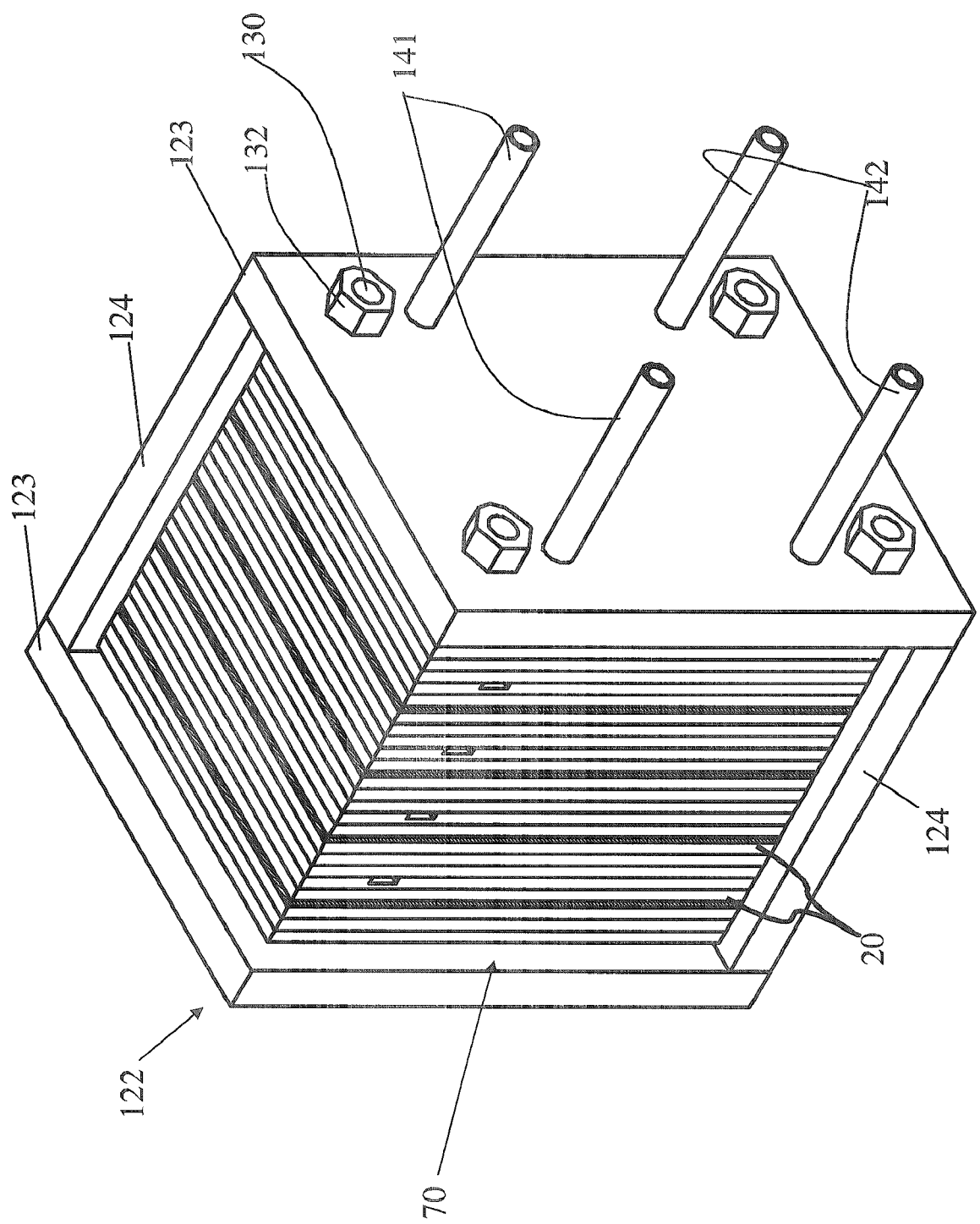
FIG. 1C schematically shows a perspective view of a stack of Na-Air cells shown in FIGS. 1A and 1B, in accordance with an embodiment of the invention.

In a stack of cells, connected in series to provide a battery, with an open circuit voltage equal to a sum of the open circuit voltages of the cells in the stack, generally all except the outermost contact plates in the stack make contact with both an anode and a cathode in the stack and are conventionally referred to as Bipolar Plates (BPP). A stack 70 of Na-Air battery cells 20 is shown in FIG. 1C and discussed below. Contact plates 30 may be formed from any suitable material that does not react or alloy with Na. Optionally, contact plates 30 are formed from aluminum.

Anode 40 comprises molten Na, optionally held and supported by a porous substrate (not shown) formed from a suitable material such as graphite, intercalation compounds of graphite, high surface area carbons, carbon nanotubes, and metal sponges of aluminum, titanium or an aluminum-titanium alloy. To improve contact of the molten Na to a metal sponge substrate, it is advantageous to coat the substrate with a layer, of carbon or graphite that is less than about 1 micron to cover surfaces of voids in the substrate. Coating can be done by common techniques, including for example, spraying of or dipping in, a suspension of nano size particles of carbon or graphite and an appropriate compatible binder such as Teflon, PVDF, poly vinyl alcohol and carboxy methyl cellulose (CMC), or chemical vapor deposition of carbon or graphite. In some embodiments of the invention, anode 40 comprises an Na foil.

Cell 20 is operated at a temperature greater than or equal to a temperature above the melting point, 97.8° C., of Na to maintain the Na in a molten state during operation. Optionally, the cell operates at a temperature less than about 50° C. above the melting point. Optionally, the cell operates at a temperature less than about 25° C. above the melting point. Optionally, the cell operates at a temperature less than about 10° C. above the melting point. Heat for maintaining Na-Air cell 20 at a suitable operating temperature is optionally provided by heat generated from operation of the battery and/or a suitable heat source thermally coupled to contact plates 30. Optionally, air that flows through flow channels 32 is heated to maintain a desired operating temperature for the cell. Optionally, cell 20 is operated inside a suitable oven that maintains the cell at a desired operating temperature.

Anode 40 is typically covered by a thin film 42 called a Solid Electrolyte Interphase (SEI 42), which is generated by interaction of Na in anode 40 with material in electrolyte medium 50. The composition and structure of SEI 42 can substantially characterize operating features of Na-Air battery cell 20 and appropriate SEI precursors may be added to electrolyte medium 50 to promote formation of a desired and stable SEI 42. SEI 42 is preferably mechanically strong and flexible, operates to protect anode 40 from corrosion, and is an electronic insulator, but has a high cationic conductivity for Na ions.

For SEI 42 to protect anode 40 against corrosion it should completely cover the surface of anode 40 on the side of the anode facing electrolyte medium 50. If SEI 42 does not completely cover the anode surface, some of the anode surface may always be in direct contact with electrolytes in electrolyte medium 50 and corrode. Corrosion reduces the faradaic efficiency for depositing Na in and removing Na from anode 40 and thus reduces the efficiency of the charging and the discharging of Na-Air cell 20. To provide full coverage of anode 40, an equivalent volume of the SEI materials should typically be equal to or greater than an equivalent volume of the anode.

Common potential SEI components such as $Na_2CO_3$, NaF, and $Na_2O$ have equivalent volumes equal to 20.87 ml, 16 ml, and 13.7 ml, which are smaller than the equivalent volume, 23.7 ml, of Na. $Na_2CO_3$, NaF, and $Na_2O$ therefore may not be sufficient on their own to build a desired SEI 42. However, they can be used together with an appropriate SEI precursor or precursors, that have an equivalent volume larger than 23.7 ml, to provide a desirable SEI.

In accordance with an embodiment of the invention, appropriate SEI precursors whose reduction products are an electronic insulator, have equivalent volumes greater than that of Na, and are good Na ion conductors, are added to electrolyte medium 50 to promote formation of SEI 42 so that it has high cationic conductivity and covers all the surface area of anode 40. Composition and solubility of the reduction products of the SEI precursors in electrolyte medium 50 may be controlled by controlling the temperature and composition of the electrolyte medium. It is advantageous to saturate electrolyte medium 50 with the SEI precursor reduction products to reduce their solubility and thereby accelerate formation of the SEI medium.

By way of example, suitable precursor additives for forming SEI 42 are sulfur derivatives, including ethylene sulfite $C_2H_4O_3S$, and methyl methane sulfonate $C_2H_6O_3S$, which may yield one or more of the reaction products. $Na_2S_2O_4$, $Na_2S_2O_3$, $Na_2S$, and $Na_2SO_4$.

Optionally 0.1 to 20% of soluble salts of di and three valance cations such as $Ca^{+2}$, $Mg^{+2}$, $Ba^{+2}$, $Sr^{+2}$ and $Al^{+3}$ are added to electrolyte medium 50 to dope SEI 42 with cations and increase its cationic conductivity.

In addition to inorganic compounds, SEI 42 may comprise organic materials such as polymers and semi-carbonates. To provide these materials for SEI 42 from the reaction of Na with components of electrolyte medium 50 appropriate materials are advantageously added to the electrolyte medium. Suitable materials include, by way of example, CMC, vinyl acetate, vinylene carbonate, and combinations of both, 2,2-dimethoxy-propane, and pyrazole. Lactam derivatives (N-acetyl caprolactam, ε-caprolactam, N-methyl caprolactam, N-vinyl caprolactam) as SEI-forming additives can be used as well.

Electrolyte medium 50 may comprise any of various electrolyte materials, such as those noted above in the discussion of SEI 42, and mixtures of these electrolyte materials, and may include polymer electrolytes, ionic liquids, aprotic organic solvents and their mixtures. In some embodiments, medium 50 comprises a non-aqueous electrolyte, which may be solid, liquid, or a mixture of solid and liquid. The solid is typically a ceramic and may comprise materials such as lithium or sodium beta alumina, or sodium nitrite.

Optionally, electrolyte medium 50 comprises a polymer electrolyte such as: polyethylene oxide (PEO), poly(epichlorohydrin), poly(ethylene succinate), poly(8-propiolactone), poly(ethylene adipate), poly(ethyleneimine), polysiloxane and polyphosphazene. In some embodiments of the invention, electrolyte medium 50 comprises an alloyed and/or a block-polymer and co-polymer such as poly(ethylene oxide-co-propylene oxide) mono- and triacrylate. Optionally, the electrolyte medium comprises a comb-branched polyepoxide ether. Common high boiling point organic solvents used in lithium batteries can be added including for example propylene carbonate and ethylene carbonate.

Advantageously, cationic conductivity of electrolyte medium 50 is enhanced by addition of a weakly-coordinating anion with charge distributed over several coordinating atoms in the anion, such as triflate $(CF_3SO_3)^-$, perchlorate $(ClO_4)^-$, bis(oxalato)borate $(BC_4O_8^-, BOB)$ or imide/TFSI $(N(SO_2CF_3)_2)$. Optionally, electrolyte medium 50 comprises aluminum or boron derivatives with Lewis-acid properties capable of complexing salt anions (e.g. aluminate, borate, carboxylate, phosphate) to enhance cationic conductivity of the electrolyte medium.

In some embodiments of the invention, electrolyte medium 50 comprises an anion trap chosen from: calix[6]pyrrole, trialkoxyboranes, aza-ethers and supermolecular materials. Optionally, the anion-binding ability of the calixarene derivatives, are tuned by appending to their rings, different urea substituents such as: phenyl; nitrophenyl; and butyl calix[4] arene.

In some embodiments of the invention, cationic conductivity enhancement of a polymer electrolyte comprised in electrolyte medium 50 is provided by plasticizing the polymer with propylene carbonate, dioctyl phthalate, dimethyl sulfoxide, N,N-dimethylformamide, ethylene glycol, and triethylamine.

In some embodiments of the invention, electrolyte medium 50 includes a hybrid and/or gel polymer electrolyte based on PVDF and PAN.

In some embodiments of the invention, electrolyte medium 50 comprises an ionic liquid salt such as: 1-ethyl-3-methylimidazolium bis(trifluoromethylsulfonyl)imide; 1-ethyl-3-methylimidazolium tetrafluoroborate; 1-butyl-3-methylimidazolium bis(trifluoromethylsulfonyl)imide; 1-butyl-3-methylimidazolium tetrafluoroborate; 1-hexyl-3-methylimidazolium; bis(trifluoromethylsulfonyl)imide; 1-hexyl-3-methylimidazolium tetrafluoroborate; 1-butyl-2,3-dimethylimidazolium bis(trifluoromethylsulfonyl)imide; 1-butyl-2,3-dimethylimidazolium tetrafluoroborate; N-octylpyridinium tetrafluoroborate; N-butyl-4-methylpyridinium tetrafluoroborate; and N-butyl-4-methylpyridinium hexafluorophosphate.

Ionic liquids included in electrolyte medium 50 may comprise cations of the pyridine and pyrrollidinium group such as: methyl-1-propyl pyrrolidinium $[MPPyrro]^+$, 1-methyl-1-butyl pyrrolidinium $[MBPyrro]^+$, 1-methyl-1-propyl piperidinium $[MPPip]^+$, 1-methyl-1-butyl piperidinium $[MBPip]^+$, 1-methyl-1-octylpyrrolidinium $[MOPyrro]^+$ and 1-methyl-1-octylpiperidinium $[MOPip]^+$.

In some embodiments of the invention, electrolyte medium 50 comprises a sodium or other alkali metal combined with silica gel.

Air cathode 60 comprises an oxygen permeable porous substrate, which supports a gas diffusion medium (GDM), and an oxygen redox catalyst. In some embodiments of the invention, the GDM and redox catalyst are layers formed on or applied to the substrate. In some embodiments of the invention, the substrate is impregnated with GDM and/or reduction catalyst material. To moderate or prevent flooding of the porous cathode by material from electrolyte medium 50 it is beneficial to use material for the GDM and oxygen redox catalyst that are solvophobic (i.e. exhibit large contact angles with the electrolyte materials) with the electrolyte materials. As the solubility of oxygen in electrolyte medium 50 is generally very low, it can be advantageous to use a three phase zone structure of the gas electrode, as used in common PEM fuel cells, leading to a very thin oxygen diffusion layer between catalyst particles at the cathode and the gas phase.

The substrate may be a paper or cloth made of carbon and graphite, or a substrate formed form porous aluminum, titanium, nickel and their stable alloys. Optionally, the paper or cloth substrate is between about 100 μm to 400 μm thick, and characterized by hydrophobicity and a water contact angle larger than 90°. Hydrophobicity can be provided by adding to the substrate and or GDM 5% to 50% of a hydrophobic stable polymer binder such as PVDF or Teflon. Exemplary, commercially available porous cloth and paper substrates for practice of embodiments of the invention are respectively E-Teck cloths A-6 ELAT and A-10 ELAT marketed by the E-TEK Div. of De Nora N.A., Inc. of New Jersey USA, and Toray TGP-H-060 or SGL GDL25AA papers.

In some embodiments of the invention, a cathode is formed from alkali metal cation insertion materials, in which alkali metal cations can be inserted and de-inserted into channels and between layers of the material. The transition-metal chalcogenides, and transition-metal dichalcogenides such as $TiS_2$, $VSe_2$, $FeCuS_2$, $Cu_xS_y$, $VS_2$, $MoS_2$, $WS_3$ and $CoO_2$, $NiO_2$, $MoO_2$, $WO_2$ form suitable lattices and matrices for insertion of alkali metal cations.

In some embodiments the catalytic layer at the cathode comprises metal nano-particles adhered to carbon nano-particles, where the W/W ratio of the metal to carbon is advantageously between about 10% to about 90%.

Optionally, the oxygen redox catalyst comprises gold and/or a noble metal from the platinum group (Pt, Ru, Pd, Ir) and their alloys. Optionally, the catalyst comprises an oxide having spinel, perovskite, or pyrochlore structure such as: $MnO_2$, Ag, $Co_3O_4$, $La_2O_3$, $LaNiO_3$, $NiCo_2O_4$ and $LaMnO_3$.

In some embodiments of the invention, an oxygen redox catalyst is synthesized by the electroless deposition method on carbon support, or as carbon free nanoparticles, employing a reducing agent in acidic media, such as NaBH4 or by polyol method, using ethylene glycol, diethylene glycol or others resulting in nanoparticles of size smaller than 100 nm or preferably less than 10 nm. The catalyst optionally comprises transition metals such as Co, Ni, Fe and/or their alloys and/or a noble metal from the platinum group (Pt, Ru, Pd, Ir) and/or their alloys with themselves or with Co, Ni, Fe. The catalysts can be used as is or oxidized either partially or entirely to form oxide coated metal catalysts or metal oxide "nano-size" catalyst.

In some embodiments of the invention, air cathode 60 or electrolyte medium 50 contains a redox couple with fast kinetics that does not pass through SEI 42 and react with sodium anode 40 and is characterized by a potential that is less than that of the potential of the Air cathode by up to 0.3V. The redox couple removes electrons from the cathode and transfers them to oxygen in the electrolyte, and thus functions to reduce passivation of the air electrode by precipitation of oxides and peroxides on its surface.

In some embodiments of the invention, exemplary liquid anode materials comprise the alkali metals Lithium (Li), Sodium (Na), Potassium (K), Rubidium (Rb) and Cesium (Cs), or an alloy or a eutectic comprising at least two of the alkali metals or an alkali metal with a non-alkali metal. The alloy may comprise any percentages of the constituent metals, from 0% to 100%, and the alloys may be liquid at room temperature. It will be understood that a eutectic may be operated at or above its eutectic point, so that, for example, a cell comprising an Na—K eutectic as its anode may be operated at temperatures down to −12.6° C.

FIG. 1C schematically shows a stack 70 of Na-Air cells 120 similar to Na-Air cell 20, in accordance with an embodiment of the invention. Cells 120 are housed in a gas tight housing 122 optionally having two end panels 123 and four side panels 124. Two of side panels 124 are not shown in the figure so as to show stack 70. Na-Air cells 120 in stack 70 are optionally held together by mounting bolts 130 that pass through through holes (not shown) in the cells and are secured by nuts 132. The through holes and/or mounting bolts 130 are electrically insulated from the cells using any of various methods known in the art to prevent short circuiting the cells. Housing 122 is placed in an oven (not shown) controllable to heat the housing and stack 70 to an operating temperature of the stack.

Optionally, end panels 123 have coupling flow tubes 141 and 142 for connecting housing 122 to a source of oxygen (not shown) and a source of cooling fluid (not shown) respectively located outside the oven. Gas coupling tubes 141 are connected by a suitable gas flow manifold (not shown) in the housing to flow channels 32 (FIGS. 1A and 1B) of Na-Air cells 120 to provide oxygen to the flow channels and thereby to air cathodes 60. Coupling flow tubes 142 are similarly connected to a manifold (not shown) that supplies cooling fluid that enters housing 122 via the flow tubes from the source of cooling fluid to the cells.

An Na-Air cell in accordance with an embodiment of the invention similar to that shown in FIGS. 1A-1C may be assembled either in a charged state, in which anode 40 contains metallic sodium, or in a discharged state in which anode 40 does not contain metallic sodium. If the cell is assembled in the discharged state, the metallic sodium is supplied to the anode in a first charging cycle.

Example 1

An Na-Air cell in accordance with an embodiment of the invention, was assembled having an electrolyte medium 50 comprising a non-aqueous liquid electrolyte. A thin 150 μm dry glass separator was used for separating anode 40 and cathode 60 and supporting the non-aqueous liquid electrolyte in electrolyte medium 50. The glass separator was saturated with a electrolytic slurry containing 0.1M calix[6]pyrrole (CP), 1M Sodium perchlorate ($NaClO_4$) and 1 to 9% wt high surface area $Al_2O_3$ powder dispersed in polyethylene glycol dimethyl ether (PEGDME 2000): propylene carbonate (90:10% v/v). The CP is an anion trap, and was added to the slurry to enhance the cationic transference number (the relative conduction of the cations in the electrolyte) for sodium ions. The high surface area $Al_2O_3$ powder functions to immobilize the electrolyte at the operating temperature of the Na-Air cell. All solutions were prepared from analytical-grade chemicals and the electrolyte was dried first at 100° C. prior to saturation of the glass separator.

An air cathode 60 for the Na-Air battery cell was provided using a 360 μm thick E-TEK A-6 ELAT air electrode with 0.3 mg $Pt/cm^2$ (10% Pt supported XC72) coated with 4-5 mg $Na_2CO_3/cm^2$. An electrolyte slurry comprising 0.1 to 3 $mg/cm^2$ of sodium electrolyte was cast on the air electrode to improve ionic contact between the cathode and the separator. The slurry comprised a surfactant, Triton-X 100 to facilitate homogeneous coating of the electrode.

A 1 $cm^2$ sodium metal (100 μm thick Na foil) was used as an anode.

The Na-Air battery cell was fabricated in a vacuum glove box in an argon atmosphere containing less than 10 ppm water. The cell was sealed in a Nitrogen environment package, removed from the glove box and then placed in an oven. Gas flow tubes 141 (FIG. 1C) coupled flow channels 32 in contact plate 30 (FIG. 1A) adjacent air cathode 60 to a source of dry oxygen outside the oven. During operation of the Na-Air cell, the oven heated the cell to an operating temperature between 105° C. and 110° C., just above the sodium melting point (97.8° C.) and the oxygen source supplied dry oxygen to air cathode 60 at a flow rate of 10 ml/min.

The Na-Air cell was successfully charged and discharged repeatedly. The charge and discharge cycles at anode 40 are described by the equations:

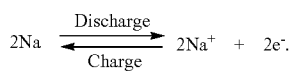

At air cathode 60, the charge and discharge equations are:

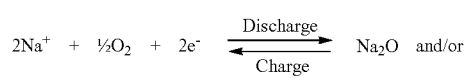

-continued

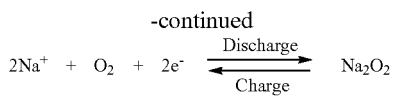

Inspection of the equations for the anode and air cathode illustrates that on discharge, reduced oxygen species are formed at the air cathode, with alkali cations provided by the anode. During discharge the cell produces energy; during charge the cell stores energy.

Figure 2A:
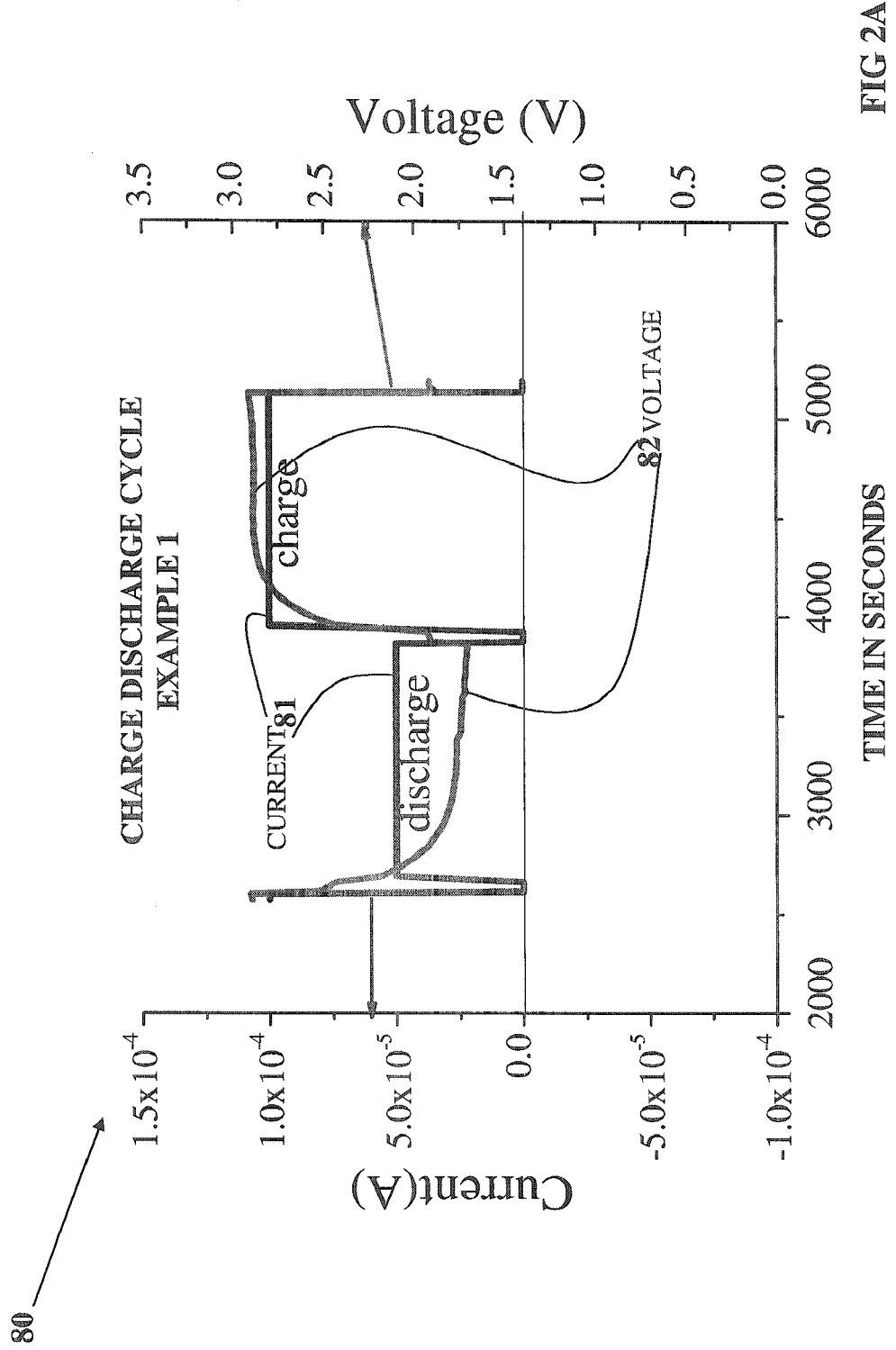
FIG. 2A shows a graph of current and voltage curves as a function of time for a discharge and charge cycle of an Na-Air cell, in accordance with an embodiment of the invention.

Operation of the cell was tested using an Arbin model BT4 battery tester. FIG. 2A shows a graph 80 of current and voltage curves 81 and 82 respectively as a function of time in seconds acquired using the battery tester for a discharge and charge cycle of the cell at currents of 50 µA and 100 µA, respectively. The cell was allowed to rest between discharge/charge for one minute. As can be seen from graph 80, a voltage plateau of 1.75V obtained on discharge. At rest, the open circuit voltage obtained was close to 2.1V.

Figure 2B:
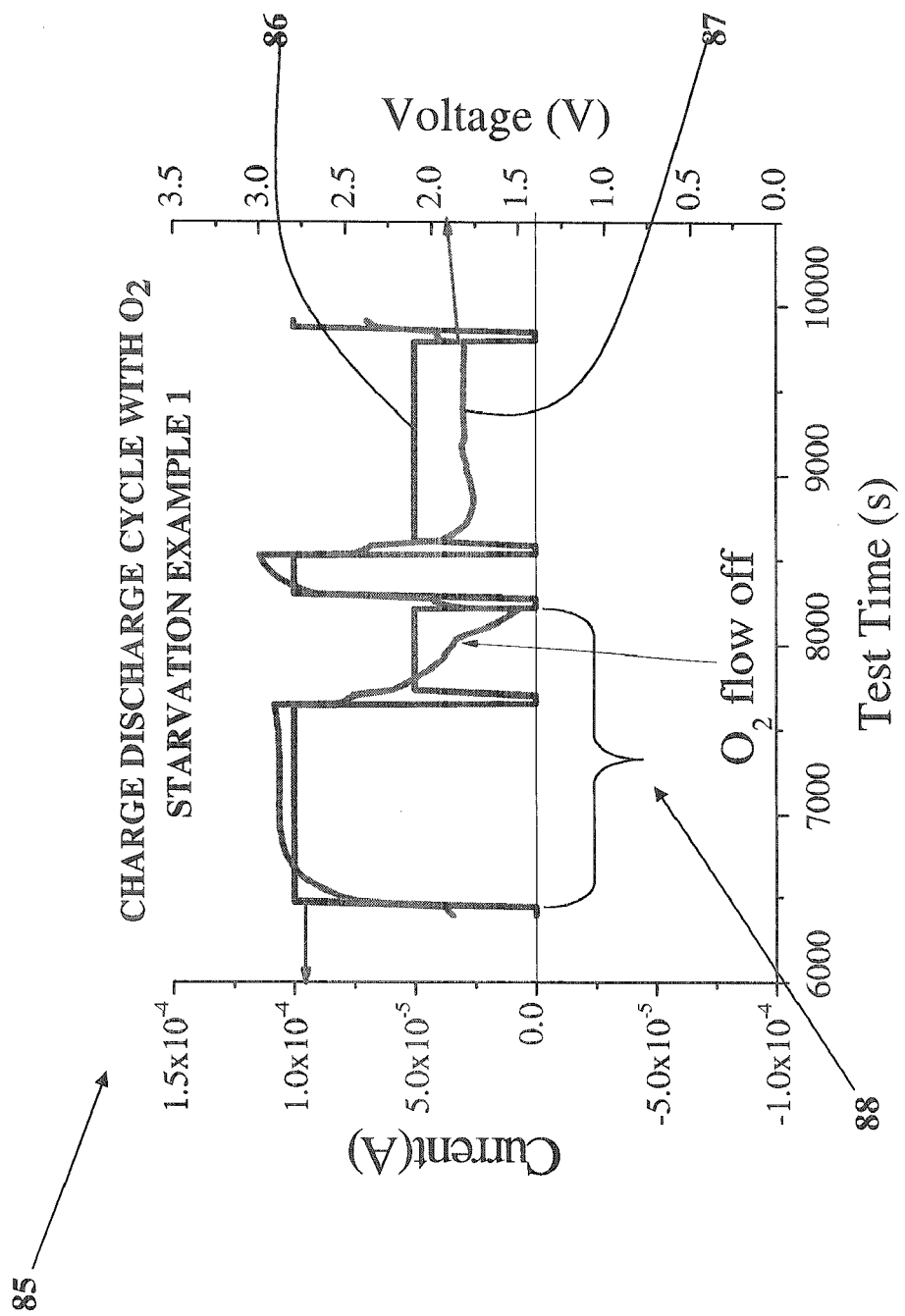
FIG. 2B shows a graph of current and voltage curves for a charge-discharge cycle when oxygen supply is interrupted to an Na-Air cell, in accordance with an embodiment of the invention.

The Na-Air cell was tested to determine effects of oxygen starvation on cell operation. FIG. 2B shows a graph 85 of current and voltage curves 86 and 87 respectively acquired using the battery tester for a fifth charge and discharge cycle 88 of the cell when oxygen flow to the cell is stopped for a period of time during discharge portion of the cycle. The graph shows that when oxygen supply to the cell is stopped, the cell voltage drops precipitously to 1.5 volts, indicating that oxygen is the active cathode material. When oxygen supply to the cell is returned, cell voltage returns to normal. The cell was charged and discharged at 100 µA and 50 µA respectively.

Example 2

Another Na-Air cell 20, in accordance with an embodiment of the invention, was produced and assembled in a discharged state. An electrolyte medium 50 and air cathode 60 similar to those used in Example 1 were fabricated for the Na-Air cell of Example 2. An aluminum foil was used as sodium anode substrate for anode 40.

The air cathode was loaded with $Na_2CO_3$. Because none of the components of the cell comprised metallic Sodium, there was no need for a vacuum glove box in which to assemble the Na-Air cell and the cell was assembled in a regular laboratory. Following assembly, the cell was heated in the oven to 105° C. under dry oxygen flow for 2 hours. It was then charged to decompose the $Na_2CO_3$, releasing $CO_2$ to the oxygen, and electroplating Na onto the aluminum foil anode substrate in accordance with the reactions: $Na_2CO_3 \rightarrow 2Na^+ + \frac{1}{2}O_2 + CO_2 + 2e^-$ and $2Na^+ + 2e^- \rightarrow 2Na$. After charging, the open circuit voltage of the cell was tested and found to be stable at 2.3V, implying successful charging of the cell. The cell was cycled, i.e. charged and discharged, at 0.5 mA.

It is noted that materials other than $Na_2CO_3$, such as sodium oxide and sodium hydroxide can be used to load the cathode for assembly of a Na-Air cell in a discharged state in accordance with an embodiment of the invention.

Example 3

An additional Na-Air cell 20, in accordance with an embodiment of the invention was produced and assembled in a discharged state.

A slurry was prepared by mixing $MnO_2$: SB carbon powder: $Na_2CO_3$ (6:59:35% wt.) and 10% v/v PTFE in distilled water using a magnetic stirrer, and then grinding the mixture for twenty four hours in a ball mill. The resultant slurry contained 90% v/v of solids ($MnO_2$: SB carbon powder: $Na_2CO_3$) and 10% v/v PTFE. The slurry was spread over E-TEK cloth, 20% PTFE GDM, dried at 110° C., and then cured in an oven at 140-350° for one hour to provide an air cathode 60 for the Na-Air cell.

An electrolyte medium 50 was similar to that in Examples 1 and 2.

An aluminum foil was used as an anode substrate.

After charging, the open circuit voltage of the cell was tested and found to be 2.3V.

Example 4

An Na-anode test cell was produced to isolate functioning of a molten Sodium anode for use in an Na-Air battery cell, in accordance with an embodiment of the invention.

Materials for an electrolyte medium 50 for the test cell were prepared by drying $NaCF_3SO_3$ (NaTf), and PEO ($5*10^6$ MW, Aldrich reagent grade) under vacuum at 150° C., and 50° C., respectively, for 48 hours. The dried NaTf was dissolved in Acetonitrile (Aldrich battery grade, 99.93%, water content below 50 ppm) (ACN,) at room temperature inside a sealed flask, and then the dried PEO was added. The solution was carefully stirred to completely dissolve the PEO. Nanoporous $Al_2O_3$ powder was vacuum dried at 150° C. for 48 hours and added to the solution (5% wt.). Methyl methane sulfonate 5% wt. was also added as an SEI precursor. The solution was magnetically stirred at room temperature for 24 hours to obtain a homogeneous slurry. The slurry was cast on a glass separator (150 µm) and the solvents slowly removed over a period of 24 hours by room temperature evaporation in an argon atmosphere dry-box having humidity content below 10 ppm to provide a free-standing, solid polymer homogeneous membrane having thickness of 200 µm and good mechanical strength. The membrane was dried under vacuum at 150° C. for at least 24 hours and shaped into a 1.8 cm² disc to provide electrolyte medium 50.

The test cell was assembled in an argon controlled atmosphere dry-box having humidity content below 10 ppm by sandwiching the electrolyte membrane between an a 0.57 cm² Na metal anode and a disk shaped Al "counter" electrode, and hermetically sealing the sandwich in a coin cell construction.

The "Na[NaTf:PEO$_6$+methyl methanesulfonate (5% wt)+ Al$_2$O$_3$ (5% wt)]/Al" test cell was successfully charged and discharged using a Maccor battery cycler for 140 cycles at an operating temperature of about 105° C. without appearance of anode dendrites. Discharging in each cycle was performed at a discharge current of 50 µA for 10 min and charging in each cycle was performed at a charging current of 25 µA for 20 minutes.

Figure 3A:
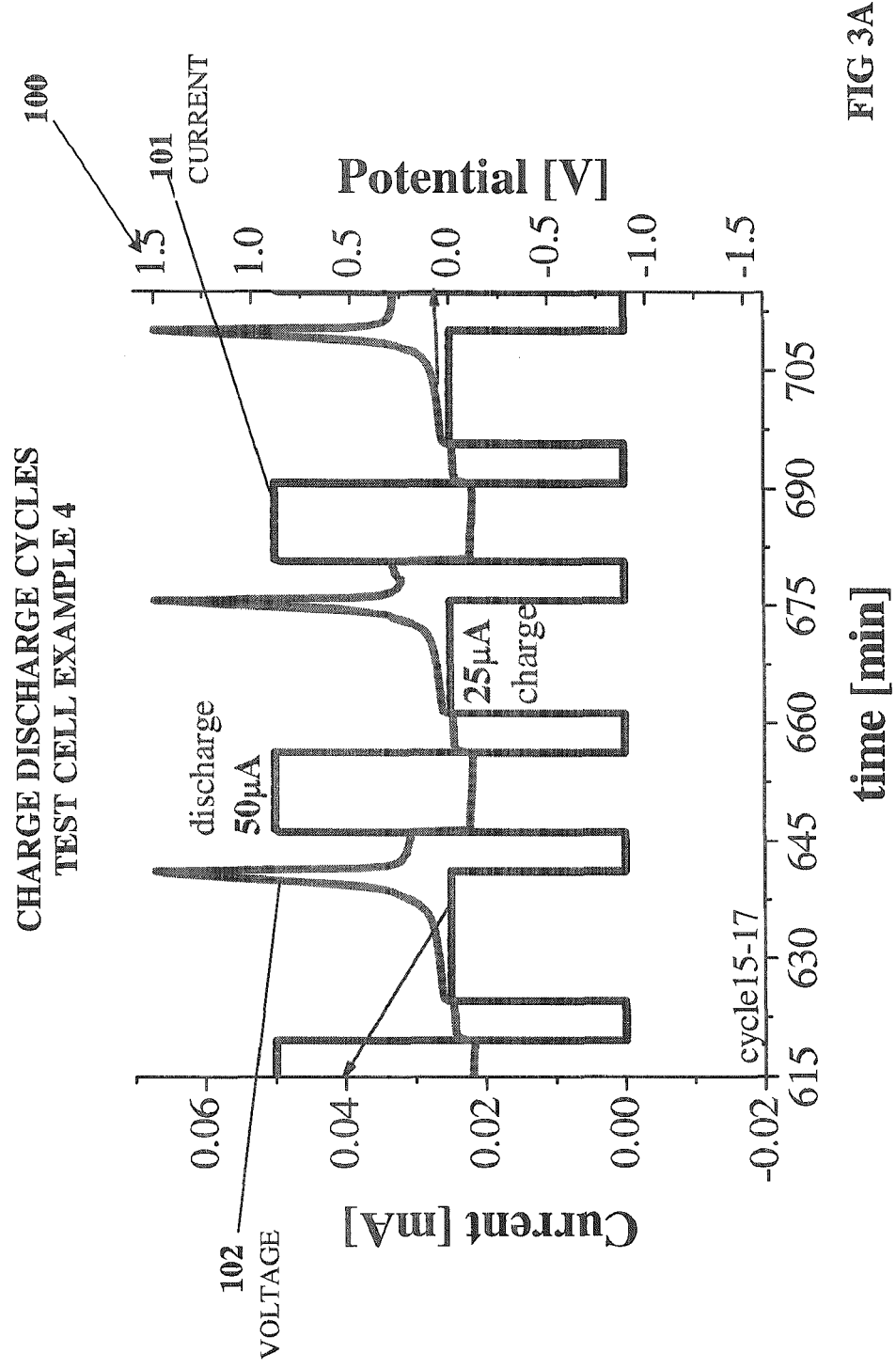
FIG. 3A shows a graph of current and voltage curves as a function of time for discharge and charge cycles of a test cell comprising Na and Al electrodes, in accordance with an embodiment of the invention.

FIG. 3A shows a graph 100 of current and voltage curves 101 and 102 as a function of time for charge discharge cycles 15-17 for the test cell. As can be deduced from graph 100, a discharge (plating of sodium on the aluminum substrate) overpotential for the test cell is 0.1049V at a discharge rate of 50 µA, and a charge (dissolution of sodium from the aluminum substrate) overpotential for the cell is 0.0385V at a charge current of 25 µA. Thus, a value of 1850 Ω/cm² can be calculated for the cell resistance at charging, and 1300 Ω/cm² at discharging.

Figure 3B:
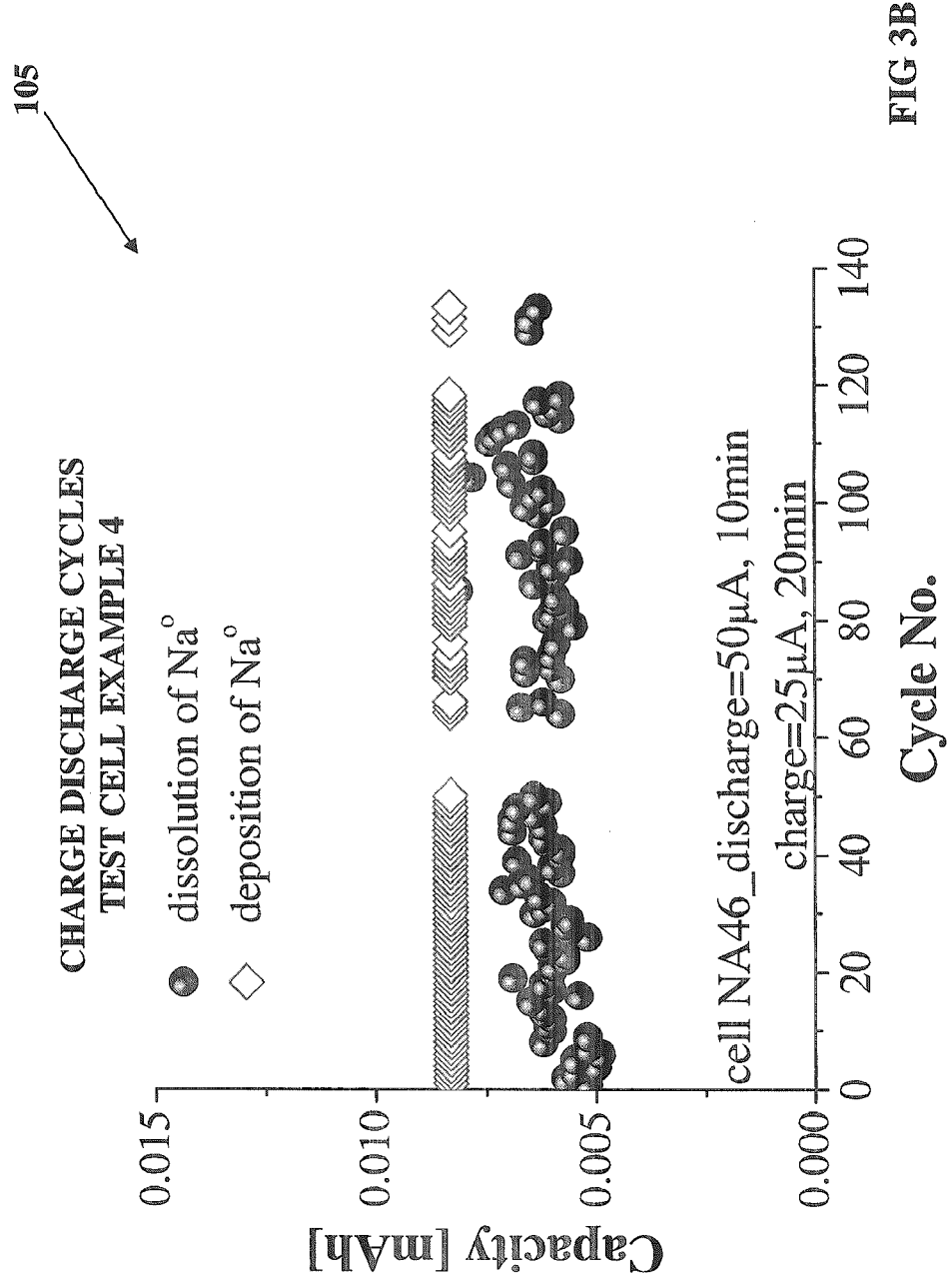
FIG. 3B shows a graph of charge discharge capacity of the test cell, in accordance with an embodiment of the invention.

FIG. 3B shows a graph 105 of charge capacity (dissolution of sodium) in milliamp-hours (mAh) and discharge capacity (deposition of sodium) in mAh as a function of charge/discharge cycle for the test cell. In each cycle the cell was discharged for 10 minutes at 50 µA and charged at a charging current of 25 µA for 20 minutes. From the graph it appears that a faradaic efficiency of the charge/discharge process for the Na anode test cell was about 85% at the $100^{th}$ cycle. It is noted that the faradaic efficiency of about 85% achieved with this example test cell is similar to the faradaic efficiency of many conventional lead acid and nickel cadmium batteries. It is anticipated that the efficiency can be further improved by running the cells at higher current density and by optimization of the concentration and the type of SEI precursors in use.

FIG. 3C shows a graph 90 of charge and discharge capacity per charge discharge cycle for an Na-Air battery cell similar to that tested to provide the results shown in FIG. 3B. However, for the results shown in graph 90 the cell was discharged for 20 minutes at 20 μA and charged with a charging current of 10 μA for 40 minutes. From the graph it appears that a faradaic efficiency of the charge/discharge process for the cell was about 65% for the cycles shown in the graph. The reduced faradaic efficiency compared to that shown in FIG. 3B may result from the lower current density at which the cell was cycled to provide the results shown in FIG. 3C.

Impedance of the Na-anode and Al disk test cell that provided the results shown in FIG. 3B was measured by electrochemical impedance spectroscopy over a frequency range from 1 MHz-10 MHz and amplitude voltage from 20 mV-100 mV using a Solartron 1255 Impedance Analyzer after the cell was equilibrated for at least 2 hours at an operating temperature of 105° C. The measurements were carried out, after sodium deposition on the Al counter electrode, after a twentieth charge discharge cycle of the cell and were made to study build up of SEI layers on the Na and Al electrodes.

It is expected that since Na is plated from the Na electrode of the cell to the cell's Al counter electrode during each discharge portion of the charge/discharge cycle that an SEI layer will be built up on the Al electrode as well as on the Na electrode. Plating of Na on the Al electrode was indicated at the end of the discharge portion of the cycle by a measured value for the cell voltage equal to 0 volts.

Figure 3D:
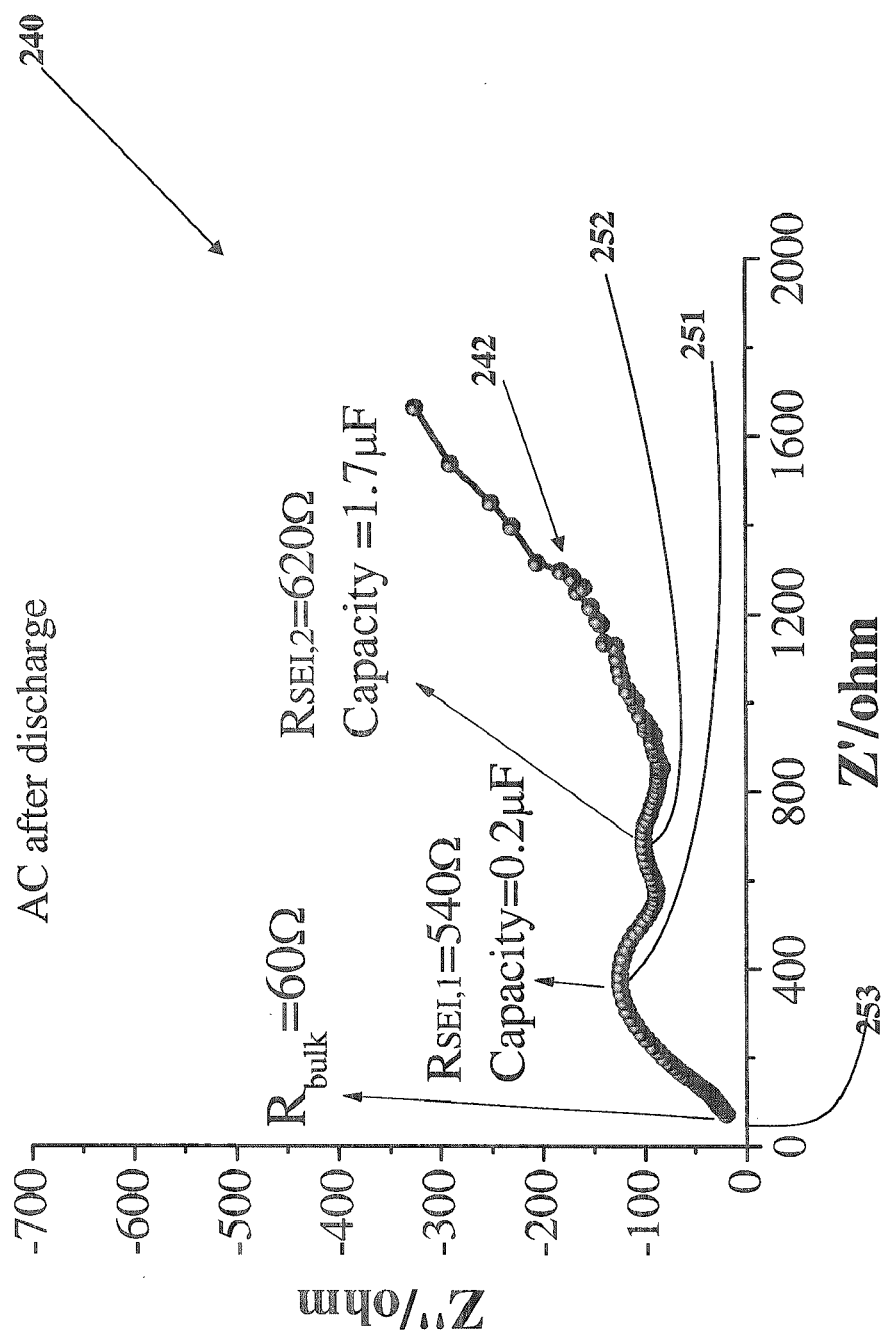
FIG. 3D shows a graph of the AC impedance spectra of the test, in accordance with an embodiment of the invention.

FIG. 3D shows a graph 240 of the AC impedance spectra of the test cell operating at about 105° C. after the twentieth discharge, i.e. after sodium deposition on the aluminum counter electrode. In the graph, a curve 242 traces the real and imaginary parts of the impedance at different frequencies, which frequency decreases along the curve from about 5 MHz near the origin to about 1 MHz at an end of the curve farthest from the origin. Values of the real and imaginary parts of the impedance for points along curve 242 are shown along the abscissa and ordinate of the graph respectively.

Local maximum 251 and 252 of curve 242 are attributed to impedance of SEI layers of different thickness on the Na and Al electrodes and indicate capacitance of the SEI layers of about 0.2 μF and 1.7 μF and having thickness of about 329 Å and about 94 Å respectively. An intersection 253 of curve 242 with the abscissa indicates a resistance of the electrolyte medium 50 of about 60 ohms and a corresponding bulk ionic conductivity for the medium of about 0.2 mS/cm similar to that of $Li^+$ conducting polymer electrolytes used in lithium-ion polymer cells.

In the description and claims of the present application, each of the verbs, "comprise" "include" and "have", and conjugates thereof, are used to indicate that the object or objects of the verb are not necessarily a complete listing of components, elements or parts of the subject or subjects of the verb Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. An energy storage cell, comprising:
   an anode comprising a molten alkali metal;
   an air cathode;
   an electrolyte medium located between the anode and the cathode;
   a solid electrolyte interphase (SEI) film covering the anode; and
   an SEI precursor, which on reduction forms the SEI film, the precursor being added to the electrolyte medium.

2. The energy storage cell according to claim 1 wherein the molten alkali metal comprises a metal from the group of metals consisting of Lithium (Li), Sodium (Na), Potassium (K), Rubidium (Rb) and Cesium (Cs).

3. The energy storage cell according to claim 2 wherein the alkali metal is comprised in an alloy of the metal.

4. The energy storage cell according to claim 3 wherein the alloy comprises at least two alkali metals.

5. The energy storage cell according to claim 3 wherein the alloy comprises at least one metal from the group of metals consisting of: Gold (Au), Mercury (Hg), Indium (In), Lead (Pb), Antimony (Sb), Tin (Sn), Bismuth (Bi), and Tellurium (Tl).

6. The energy storage cell according to claim 1 wherein the temperature of the molten alkali metal is less than about 50° C. above the melting point of the metal.

7. The energy storage cell according to claim 6 wherein the temperature of the molten alkali metal is less than about 25° C. above the melting point of the metal.

8. The energy storage cell according to claim 7 wherein the temperature of the molten alkali metal is less than about 10° C. above the melting point of the metal.

9. The energy storage cell according to claim 1 wherein the molten alkali metal is supported by a porous substrate.

10. The energy storage cell according to claim 9 wherein the porous substrate comprises at least one of: graphite, an intercalation compound of graphite, a high surface area carbon, carbon nanotubes, a sponge of aluminum, a sponge of titanium, and a sponge of an aluminum-titanium alloy.

11. The energy storage cell according to claim 10 wherein the porous substrate is formed from at least one of the sponge of aluminum, the sponge of titanium, and the sponge of aluminum-titanium alloy, and comprises a covering layer of at least one of carbon and graphite, wherein the covering layer has a thickness less than about 1 micron.

12. The energy storage cell according to claim 1 wherein the electrolyte medium is a non-aqueous medium.

13. The energy storage cell according to claim 12, wherein the non-aqueous medium comprises at least one of a solid and a liquid.

14. The energy storage cell according to claim 13, wherein the solid comprises at least one of sodium beta alumina, lithium beta alumina, and sodium nitrite.

15. The energy storage cell according to claim 1 wherein the electrolyte medium comprises at least one of an ionic liquid and a polymer electrolyte.

16. The energy storage cell according to claim 15 wherein the electrolyte medium comprises the alkali metal.

17. The energy storage cell according to claim 1, wherein the solid electrolyte interphase film has an equivalent volume at least equal to the equivalent volume of the alkali metal.

18. The energy storage cell according to claim 1 and comprising a gas delivery system that delivers at least one of air and oxygen to the air cathode.

19. The energy storage cell according to claim 1 wherein the air cathode comprises an oxygen redox catalyst.

20. The energy storage cell according to claim 19 wherein the redox catalyst comprises at least one of $MnO_2$, Ag, $CO_3O_4$, $La_2O_3$, $LaNiO_3$, $NiCo_2O_4$ and $LaMnO_3$.

21. The energy storage cell according to claim 19 wherein the air cathode is formed having a three phase structure in which the catalyst is located, and in which oxygen, material from the electrolyte medium, and the catalyst interact.

22. The energy storage cell according to claim 1, and comprising reduced oxygen species which are formed at the air cathode with alkali cations provided by the anode, on discharge of the cell.

23. The energy storage cell according to claim 1, wherein the cell is rechargeable.

24. A stack of energy storage cells according to claim 1 comprising an electrically conducting bipolar plate located between each pair of cells.

25. The energy storage cell according to claim 1, wherein the SEI film comprises a component having an equivalent volume smaller than the equivalent volume of the alkali metal.

26. The energy storage cell according to claim 1, and comprising SEI precursor reduction products saturating the electrolyte medium.

27. The energy storage cell according to claim 1, wherein the SEI precursor comprises sulfur derivatives.

28. The energy storage cell according to claim 1, wherein the SEI film comprises an organic material.

29. A method for producing an energy storage cell comprising:
   forming an anode comprising a molten alkali metal;
   forming an air cathode;
   locating an electrolyte medium between the anode and cathode;
   covering the anode with a solid electrolyte interphase (SEI) film; and
   adding an SEI precursor, which on reduction forms the SEI film, to the electrolyte medium.

30. The method according to claim 29 wherein the molten alkali metal comprises a metal from the group of metals consisting of Lithium (Li), Sodium (Na), Potassium (K), Rubidium (Rb) and Cesium (Cs).

31. The method according to claim 29, wherein the temperature of the molten alkali metal is less than about 50° C. above the melting point of the metal.

32. The method according to claim 29 wherein the molten alkali is supported by a porous substrate.

33. The method according to claim 29 wherein the electrolyte medium is a non-aqueous medium.

34. The method according to claim 29 wherein the electrolyte medium comprises at least one of an ionic liquid and a polymer electrolyte.

35. The method according to claim 29, wherein the solid electrolyte interphase film has an equivalent volume at least equal to the equivalent volume of the alkali metal.

36. The method according to claim 29 and comprising providing a gas delivery system that delivers at least one of air and oxygen to the air cathode.

37. The method according to claim 29 wherein the air cathode comprises an oxygen redox catalyst.

38. The method according to claim 29, and comprising forming reduced oxygen species at the air cathode with alkali cations provided by the anode, on discharge of the cell.

39. The method according to claim 29, wherein the cell is rechargeable.

40. A method for generating energy, comprising:
   forming a cell having an anode comprising a molten alkali metal;
   forming an air cathode in the cell;
   locating an electrolyte medium between the anode and cathode;
   covering the anode with a solid electrolyte interphase (SEI) film;
   adding an SEI precursor, which on reduction forms the SEI film, to the electrolyte medium; and
   discharging the cell.

* * * * *